(12) United States Patent
Tsai et al.

(10) Patent No.: US 11,575,286 B2
(45) Date of Patent: Feb. 7, 2023

(54) MOTOR AND SPOKE-TYPE ROTOR STRUCTURE THEREOF

(71) Applicant: NATIONAL CHENG KUNG UNIVERSITY, Tainan (TW)

(72) Inventors: Mi-Ching Tsai, Tainan (TW); Min-Fu Hsieh, Tainan (TW); Kai-Jung Shih, Tainan (TW); Lucio Jose Fernando Caceres Vera, Tainan (TW)

(73) Assignee: National Cheng Kung University, Tainan (TW)

( * ) Notice: Subject to any disclaimer, the term of this patent is extended or adjusted under 35 U.S.C. 154(b) by 115 days.

(21) Appl. No.: 17/106,759

(22) Filed: Nov. 30, 2020

(65) Prior Publication Data

US 2021/0320541 A1 Oct. 14, 2021

(30) Foreign Application Priority Data

Apr. 13, 2020 (TW) .................................. 109112382

(51) Int. Cl.
| | |
|---|---|
| *H02K 1/276* | (2022.01) |
| *H02K 1/28* | (2006.01) |
| *H02K 16/02* | (2006.01) |
| *H02K 15/03* | (2006.01) |

(52) U.S. Cl.
CPC ............ *H02K 1/2773* (2013.01); *H02K 1/28* (2013.01); *H02K 15/03* (2013.01); *H02K 16/02* (2013.01); *H02K 2213/03* (2013.01)

(58) Field of Classification Search
CPC .... H02K 1/272; H02K 1/2773; H02K 1/2766; H02K 1/276; H02K 2213/03; H02K 1/27; H02K 1/274
See application file for complete search history.

(56) References Cited

U.S. PATENT DOCUMENTS

| 2017/0057373 A1* | 3/2017 | Hao | ........................ H02K 11/33 |
| 2018/0062461 A1* | 3/2018 | Gieras | ..................... H02K 21/14 |
| 2021/0135522 A1* | 5/2021 | Dong | ................... H02K 1/2766 |

FOREIGN PATENT DOCUMENTS

CN 102170212 B 7/2012

\* cited by examiner

*Primary Examiner* — Quyen P Leung
*Assistant Examiner* — Christopher S Leone
(74) *Attorney, Agent, or Firm* — Rosenberg, Klein & Lee

(57) ABSTRACT

A motor and a spoke-type rotor structure thereof are disclosed. The rotor structure comprises a rotor core which has a plurality of spoke-type first magnetic members. Two oblique second magnetic members arranged in a V shape are provided between every adjacent two of the first magnetic members. A radius of the rotor core is R. A length of the first magnetic member is ls. A length of the second magnetic member is lv. A length component of the second magnetic member on the radius of the rotor core is x. An included angle between the first magnetic member and the second magnetic member is β. An included angle between every adjacent two of the first magnetic members is α. The parameters satisfy:

$ls + x < R$, wherein $x = lv \cdot \cos(180° - β)$;

$90° + α/2 < β < 180°$.

12 Claims, 10 Drawing Sheets

MOTOR AND SPOKE-TYPE ROTOR STRUCTURE THEREOF

FIELD OF THE INVENTION

The present invention relates to a motor and a spoke-type rotor structure thereof, and more particularly to a rotor core having two oblique second magnetic members arranged in a V shape relative to the rotor core and located between every adjacent two of spoke-type first magnetic members.

BACKGROUND OF THE INVENTION

Referring to FIG. 6, a conventional motor structure comprises a rotor (A) and a corresponding stator (B). The rotor (A) has a plurality of magnetic members (A1) arranged annularly. The stator (B) has a plurality of stator windings (B1) corresponding to the magnetic members (A1). When the motor runs, the magnetic lines of force generated by the magnetic members (A1) of the rotor (A) are partially directed to the inside of the rotor (A). This will cause the loss of magnetic lines of force and affects the efficiency of the motor.

In order to improve the above problem, another conventional motor structure as shown in FIG. 7 is developed, which comprises a rotor (C) and a stator (D). The rotor (C) has a plurality of first magnetic members (C1) arranged annularly. A second magnetic member (C2) is provided between every adjacent two of the first magnetic members (C1). The second magnetic member (C2) extends linearly. The stator (D) has a plurality of stator windings (D1) corresponding to the first magnetic members (C1) and the second magnetic members (C2), thereby reducing the loss of magnetic lines of force. Please refer to Chinese Patent Publication No. CN102170212 titled "Permanent Magnet Rotating Motor", which discloses a similar motor structure.

SUMMARY OF THE INVENTION

According to one aspect of the present invention, a spoke-type rotor structure for a motor is provided. The rotor structure comprises a rotor core. The rotor core has a plurality of spoke-type first magnetic members that are arranged radially around a periphery of the rotor core. Two oblique second magnetic members are provided between every adjacent two of the first magnetic members. The two second magnetic members are arranged in a V shape relative to a center of the rotor core.

According to another aspect of the present invention, a motor structure having the aforesaid rotor structure is provided. The motor structure further comprises a stator core. The stator core covers the rotor core. The stator core has a plurality of stator windings arranged annularly. The stator windings corresponding to the first magnetic members and the second magnetic members.

Preferably, a radius of the rotor core is R, a length of the first magnetic member is ls, a length of the second magnetic member is lv, a length component of the second magnetic member on the radius of the rotor core is x, an included angle between the first magnetic member and the second magnetic member is $\beta$, an included angle between every adjacent two of the first magnetic members is $\alpha$, and the above parameters satisfy:

$ls+x<R$, wherein $x=lv \cdot \cos(180°-\beta)$;

$90°+\alpha/2<\beta<180°$.

Preferably, every adjacent two of the first magnetic members and the two second magnetic members jointly surround an area, the first magnetic members and the second magnetic members face the area with a same magnetic pole.

Preferably, in the rotor core, a distance t1 between the two second magnetic members is between 10% and 40% of a length lv of the second magnetic member. Preferably, in the rotor core, the distance t1 between the two second magnetic members is between 30% and 50% of a thickness T of the second magnetic member.

Preferably, a distance t2 between the second magnetic member and the first magnetic member is between 10% and 40% of a length lv of the second magnetic member. Preferably, in the rotor core, the distance t2 between the second magnetic member and the first magnetic member is between 30% and 50% of a width T of the second magnetic member.

According to the above technical features, the following effects can be achieved:

1. Compared to the conventional motor having the second magnetic member arranged linearly, the motor having the second magnetic members arranged in a V shape of the present invention is less likely to reach magnetic saturation, so it can generate a higher rotational speed.

2. Compared to the conventional motor having the second magnetic member arranged linearly, when the motor having the second magnetic members arranged in a V shape of the present invention is actuated, the stress distribution is relatively even, and it is not easy to have stress concentration.

3. The structural strength of the rotor core of the present invention is higher, so it can withstand higher stress and rotational speed without deformation.

4. The motor of the present invention can generate higher torque to withstand larger loads.

DESCRIPTION OF THE PREFERRED EMBODIMENTS

Embodiments of the present invention will now be described, by way of example only, with reference to the accompanying drawings.

Figure 1:
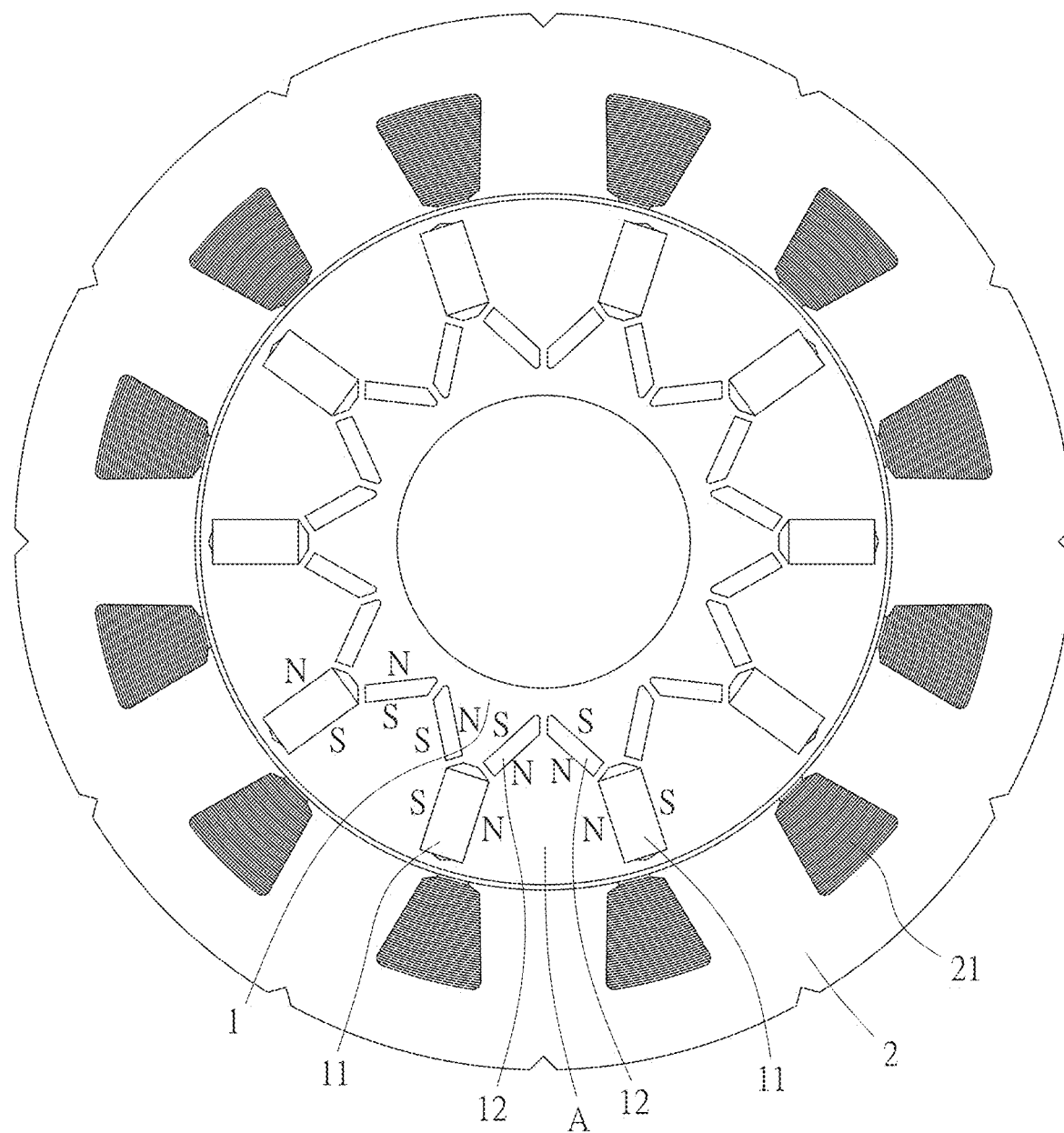
FIG. 1 is a schematic view of the motor structure of the present invention.

As shown in FIG. 1, a motor according to an embodiment of the present invention comprises a rotor core (1) and a stator core (2). The rotor core (1) has a plurality of spoke-type first magnetic members (11) that are arranged radially around the periphery of the rotor core (1). Two oblique second magnetic members (12) are provided between every adjacent two of the first magnetic members (11). The two second magnetic members (12) are arranged in a Vshape relative to the center of the rotor core (1). Every adjacent two of the first magnetic members (11) and the two second magnetic members (12) jointly surround an area (A). The first magnetic members (11) and the second magnetic members (12) face the area (A) with the same magnetic pole. The stator core (2) covers the rotor core (1). The stator core (2) has a plurality of stator windings (21) arranged annularly. The stator windings (21) correspond to the first magnetic members (11) and the second magnetic members (12).

Figure 2:
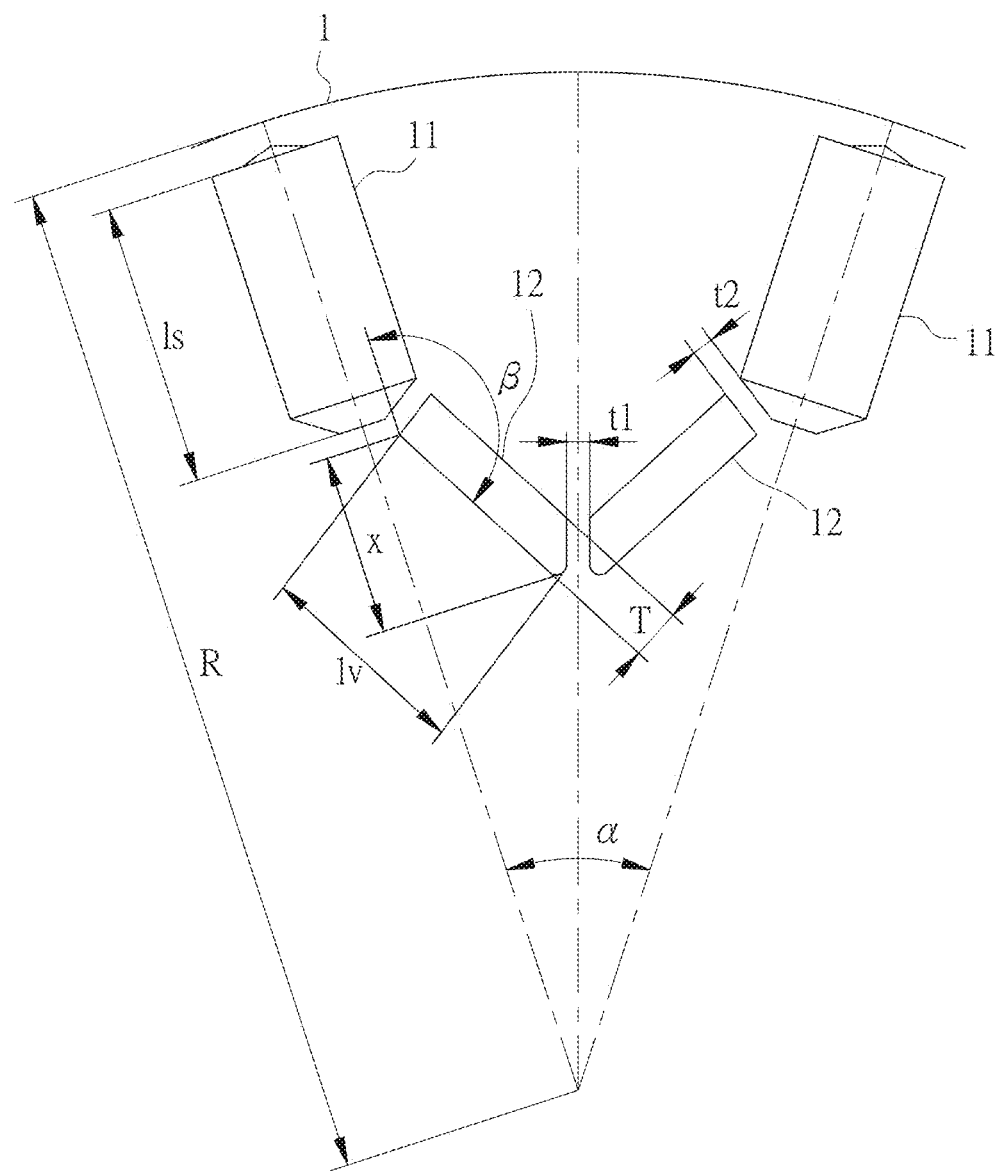
FIG. 2 is a schematic view of the arrangement of the first magnetic members and the second magnetic members of the rotor core of the present invention.

Referring to FIG. 2, the first magnetic members (11) and the second magnetic members (12) of the rotor core (1) are arranged in the following relational formula. Wherein, the radius of the rotor core (1) is R, the length of the first magnetic member (11) is ls, the length of the second magnetic member (12) is lv, the length component of the second magnetic member (12) on the radius of the rotor core (1) is x, the included angle between the first magnetic member (11) and the second magnetic member (12) is β, the included angle between every adjacent two of the first magnetic members (11) is α, and the above parameters satisfy:

$$ls+x<R, \text{ wherein } x=lv\cdot\cos(180°-\beta);$$

$$90°+\alpha/2<\beta<180°.$$

Furthermore, in the rotor core (1), the distance t1 between the two second magnetic members (12) is between 10% and 40% of the length lv of the second magnetic member (12). The distance t1 between the two second magnetic members (12) is between 30% and 50% of the thickness T of the second magnetic member (12). The distance t2 between the second magnetic member (12) and the first magnetic member (11) is between 10% and 40% of the length lv of the second magnetic member (12). The distance t2 between the second magnetic member (12) and the first magnetic member (11) is between 30% and 50% of the width T of the second magnetic member (12).

Figure 7:
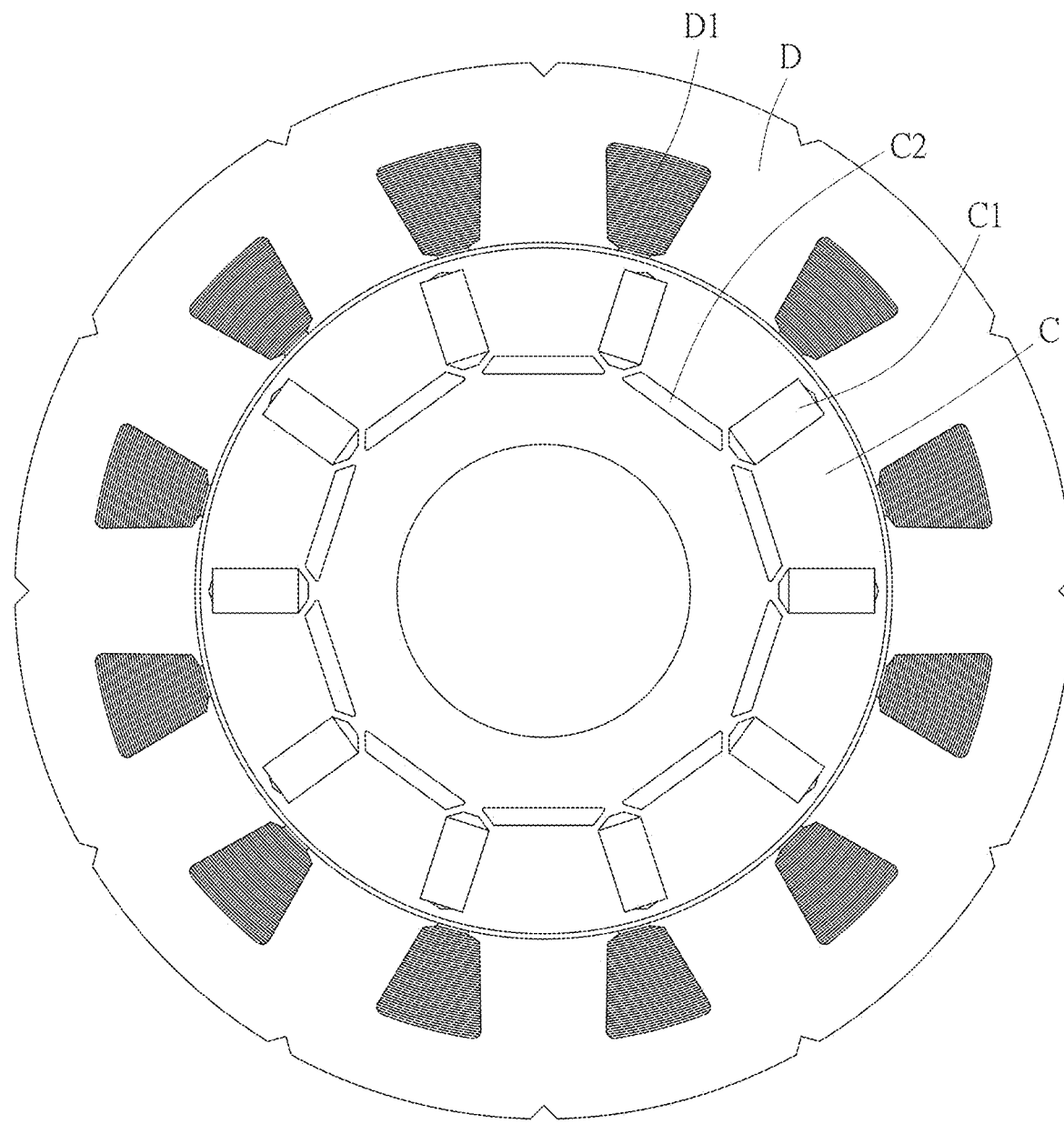
FIG. 7 is a schematic view of another conventional motor structure.

The motor (S+V) of the present invention is numerically simulated according to the above parameters, and compared with the motor (S+Flat) having the second magnetic member (C2) arranged linearly as shown in FIG. 7, as shown in the following table:

PM width is the width (mm) of the second magnetic member (12)/(C2);

PM length is the length (mm) of the second magnetic member (12)/(C2);

Ribs is the distance between the first magnetic member (11)/(C1) and the second magnetic member (12)/(C2), and the embodiment of the present invention also includes the distance (mm) between the second magnetic members (12);

PM area is the area ($mm^2$) of the second magnetic member (12)/(C2);

Torque is the torque of the motor (S+V)/(S+Flat).

|  |  | PM width | PM length | β | Ribs | PM Area | Torque |
|---|---|---|---|---|---|---|---|
| 1.1 | S + V | 4 | 8.7266026 | 109 | 1 1 1 | 34.90641 | 129.2731 |
|  | S + Flat | 4.001098 | 8.7242068 | 108 | 1.5 1.5 | 34.90641 | 128.95852 |
|  | Improvement |  |  |  |  |  | 0.25% |
| 1.2 | S + V | 4 | 9.488881 | 130 | 1 1 1 | 37.955524 | 133.0696 |
|  | S + Flat | 4.350599 | 8.7242068 | 108 | 1.5 1.5 | 37.955552 | 129.87007 |
|  | Improvement |  |  |  |  |  | 2.4% |
| 1.3 | S + V | 4 | 12.086441 | 150 | 1 1 1 | 48.345765 | 139.0365 |
|  | S + Flat | 5.541566 | 8.7242068 | 108 | 1.5 1.5 | 48.345765 | 132.01457 |
|  | Improvement |  |  |  |  |  | 5.3% |
| 1.4 | S + V | 4 | 16.856085 | 165 | 1 1 1 | 67.424342 | 146.2034 |
|  | S + Flat | 7.728421 | 8.7242068 | 108 | 1.5 1.5 | 67.424342 | 133.65454 |
|  | Improvement |  |  |  |  |  | 9.3% |
| 2.1 | S + V | 4 | 8.2265264 | 109 | 1 2 1 | 32.906106 | 123.7546 |
|  | S + Flat | 4.001276 | 8.2239021 | 108 | 2 2 | 32.906106 | 123.21845 |
|  | Improvement |  |  |  |  |  | 0.43% |
| 2.2 | S + V | 4 | 8.9496137 | 130 | 1 2 1 | 35.798455 | 127.4238 |
|  | S + Flat | 4.352977 | 8.2239021 | 108 | 2 2 | 35.798455 | 124.05709 |
|  | Improvement |  |  |  |  |  | 2.7% |
| 2.3 | S + V | 4 | 11.413625 | 150 | 1 2 1 | 45.6545 | 133.1373 |
|  | S + Flat | 5.55144 | 8.2239021 | 108 | 2 2 | 45.6545 | 125.96888 |
|  | Improvement |  |  |  |  |  | 5.7% |
| 2.4 | S + V | 4 | 15.938046 | 165 | 1 2 1 | 63.752185 | 140.8461 |
|  | S + Flat | 7.75206 | 8.2239021 | 108 | 2 2 | 63.752185 | 127.58098 |
|  | Improvement |  |  |  |  |  | 10.39% |
| 3.1 | S + V | 4 | 7.7264502 | 109 | 1 3 1 | 30.905801 | 117.4587 |
|  | S + Flat | 4.001478 | 7.7235973 | 108 | 2.5 2.5 | 30.905801 | 117.13015 |
|  | Improvement |  |  |  |  |  | 0.28% |
| 3.2 | S + V | 4 | 8.4103463 | 130 | 1 3 1 | 33.641385 | 121.0162 |
|  | S + Flat | 4.355663 | 7.7235973 | 108 | 2.5 2.5 | 33.641385 | 117.89325 |
|  | Improvement |  |  |  |  |  | 2.64% |
| 3.3 | S + V | 4 | 10.740809 | 150 | 1 3 1 | 42.963234 | 127.4567 |
|  | S + Flat | 5.562594 | 7.7235973 | 108 | 2.5 2.5 | 42.963234 | 119.64654 |
|  | Improvement |  |  |  |  |  | 6.5% |
| 3.4 | S + V | 4 | 15.020007 | 165 | 1 3 1 | 60.080028 | 135.7387 |
|  | S + Flat | 7.778762 | 7.7235973 | 108 | 2.5 2.5 | 60.080028 | 120.85969 |
|  | Improvement |  |  |  |  |  | 12.3% |

-continued

|   |             | PM width | PM length | β   | Ribs    | PM Area   | Torque    |
|---|-------------|----------|-----------|-----|---------|-----------|-----------|
| 4 | S + V       | 4        | 19.656569 | 179 | 1 7 1   | 78.626277 | 148.0156  |
|   | S + Flat    | 13.74014 | 5.7223782 | 108 | 4.5 4.5 | 78.626277 | 94.497072 |
|   | Improvement |          |           |     |         |           | 56.6%     |

There are 4 groups in the above numerical simulation. Each group sets a different Ribs value. The same group has the same Ribs value. Each group is under the same Ribs value, and the numerical simulation is performed with different β angles. According to the results of numerical simulation, it can be found that in the Torque of each group, the motor (S+V) of the present invention is better than the motor (S+Flat) having the second magnetic member (C2) arranged linearly.

Numerical simulation is performed with the following parameters to evaluate the deformations of the motor (S+V) of the present invention and the conventional motor (S+Flat) under magnetic saturation, stress distribution and high-speed operation.

|                                                                        | S + V     | S + Flat  |
|------------------------------------------------------------------------|-----------|-----------|
| Rotational speed                                                       | 6000      | 6000      |
| Area of the second magnetic member (mm^2)                              | 1280      | 1280      |
| Area where the second magnetic member can provide magnetic flux (mm^2) | 35.805*20 | 71.615*10 |
| Width of the second magnetic member (mm)                               | 3.1       | 4.032     |
| Length of the second magnetic member (mm)                              | 11.55*2   | 17.76     |
| Temperature of the second magnetic member (° C.)                       | 60        | 60        |

Figure 3A:
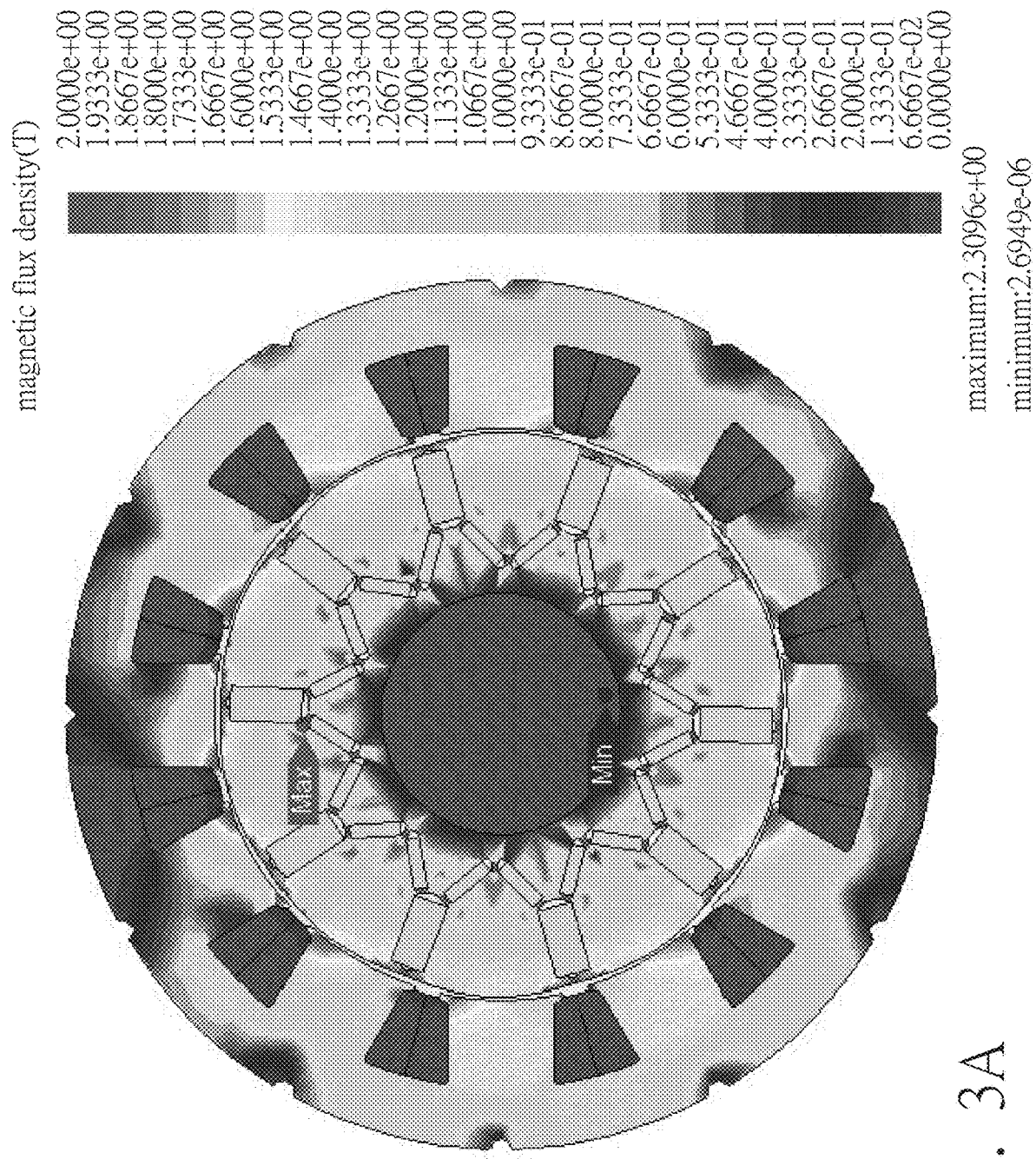
FIG. 3A is a simulation diagram of the magnetic flux density when the motor structure of the present invention is actuated.
Figure 3B:
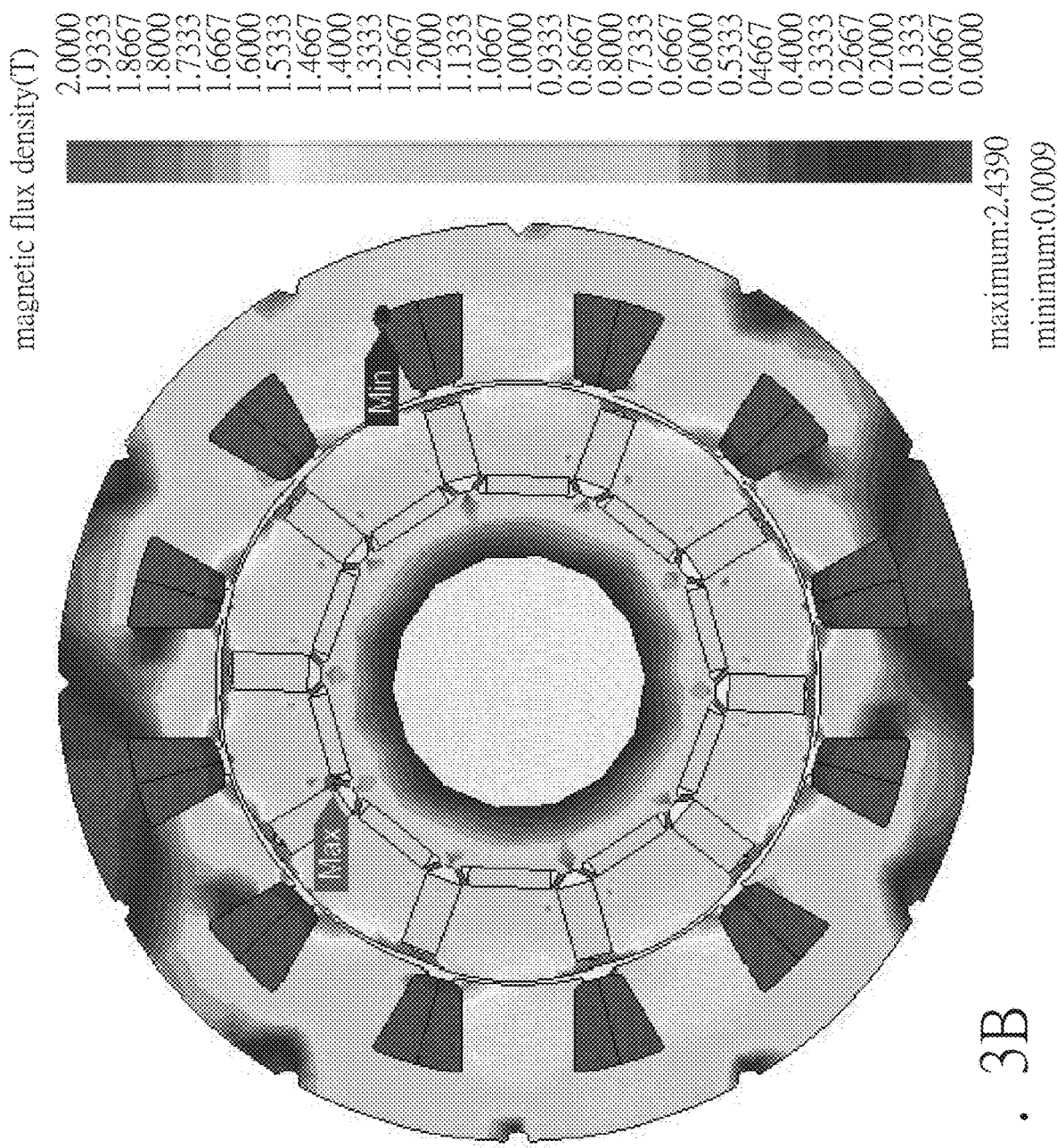
FIG. 3B is a simulation diagram of the magnetic flux density when the conventional motor structure is actuated.

Referring to FIG. 3A and FIG. 3B, compared to the conventional motor (S+Flat) having the second magnetic member (C2) arranged linearly, the motor (S+V) having the second magnetic members (12) arranged in a V shape of the present invention is less likely to reach magnetic saturation, so it can generate a higher rotational speed.

Figure 4A:
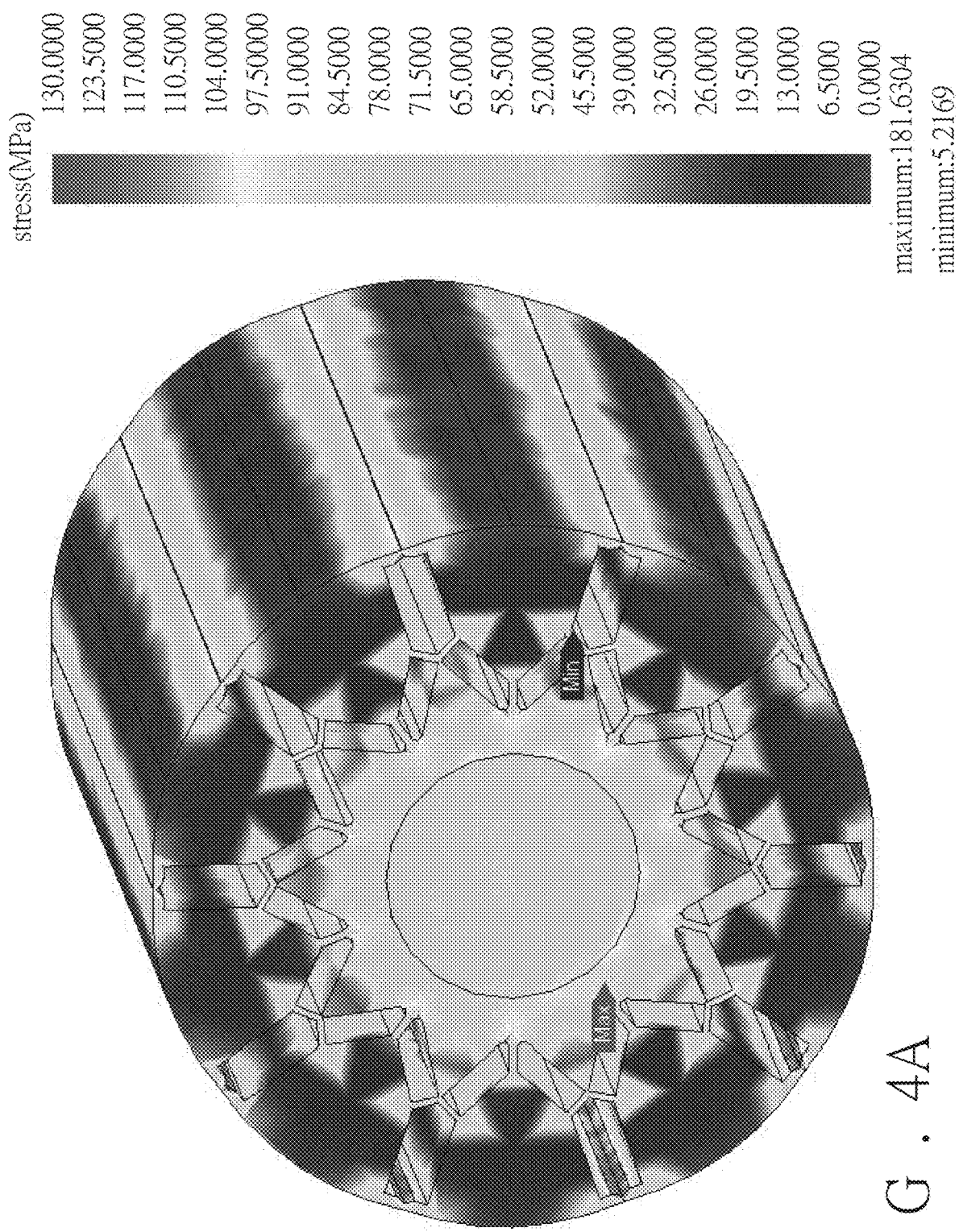
FIG. 4A is a simulation diagram of the stress distribution when the motor structure of the present invention is actuated.
Figure 4B:
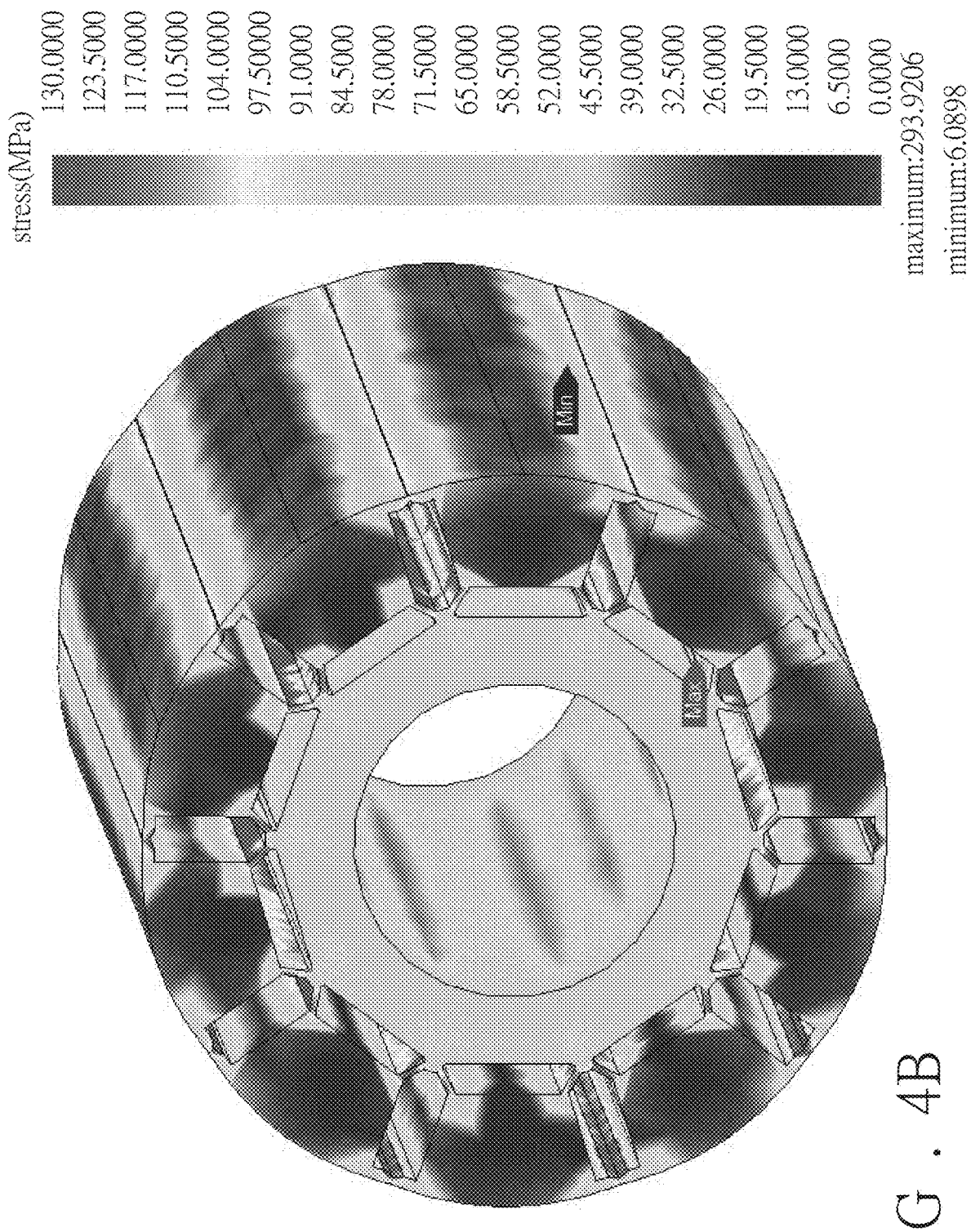
FIG. 4B is a simulation diagram of the stress distribution when the conventional motor structure is actuated.

Referring to FIG. 4A and FIG. 4B, compared to the conventional motor (S+Flat) having the second magnetic member (C2) arranged linearly, when the motor (S+V) having the second magnetic members (12) arranged in a V shape of the present invention is started, the stress distribution is relatively even, and it is not easy to have stress concentration.

Figure 5A:
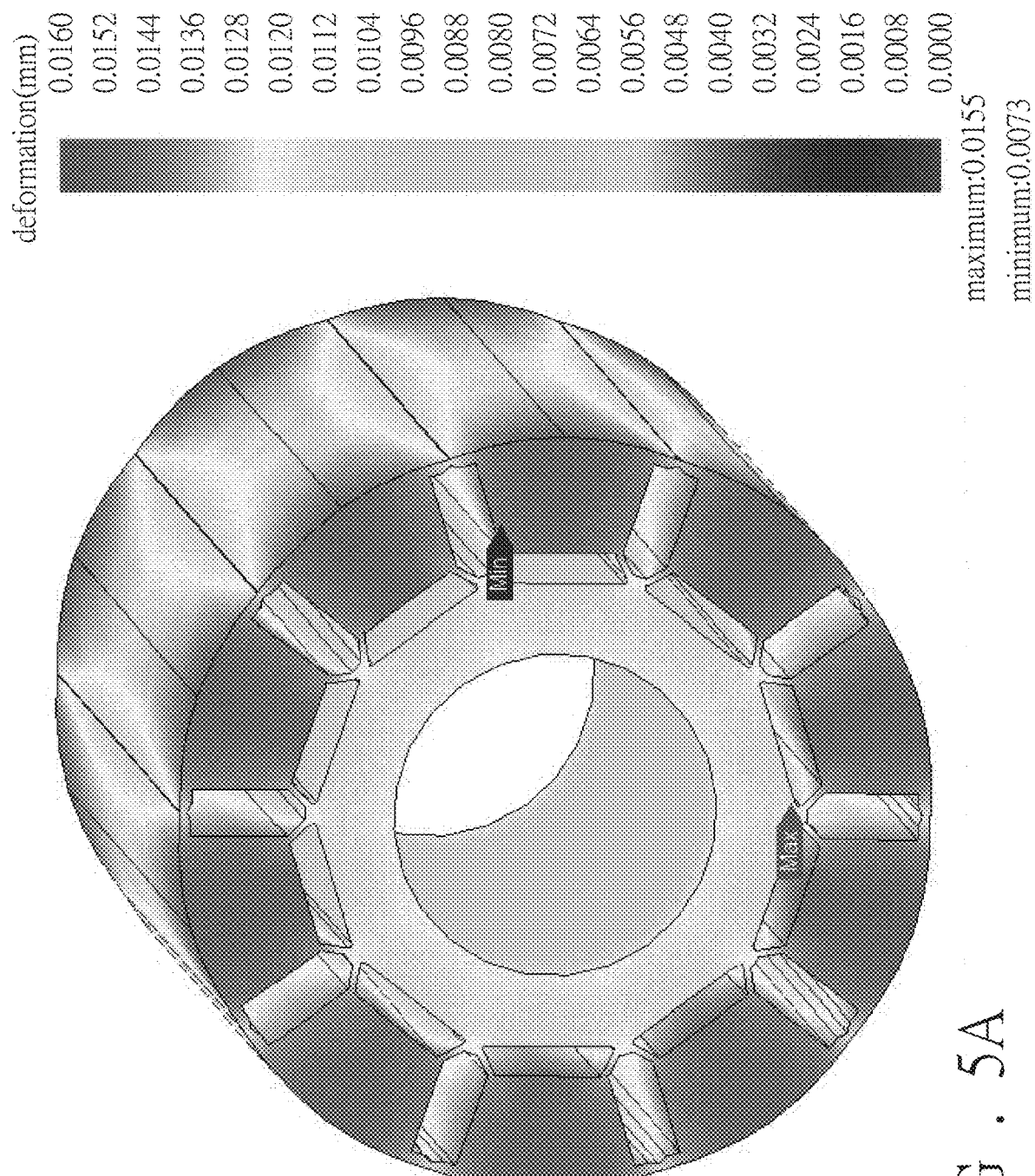
FIG. 5A is a simulation diagram of the displacement and deformation when the motor structure of the present invention is actuated.
Figure 5B:
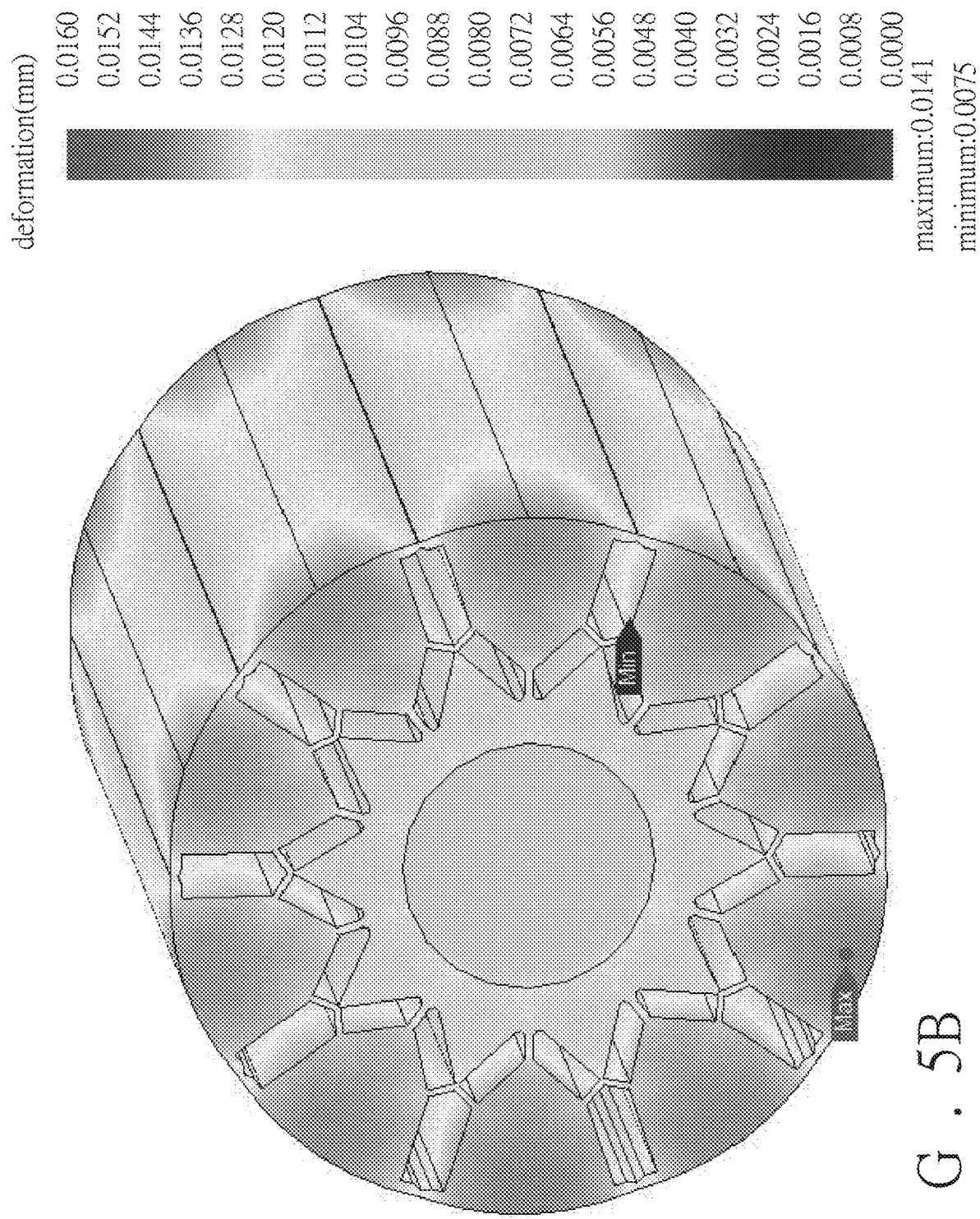
FIG. 5B is a simulation diagram of the displacement and deformation when the conventional motor structure is actuated.
Figure 6:
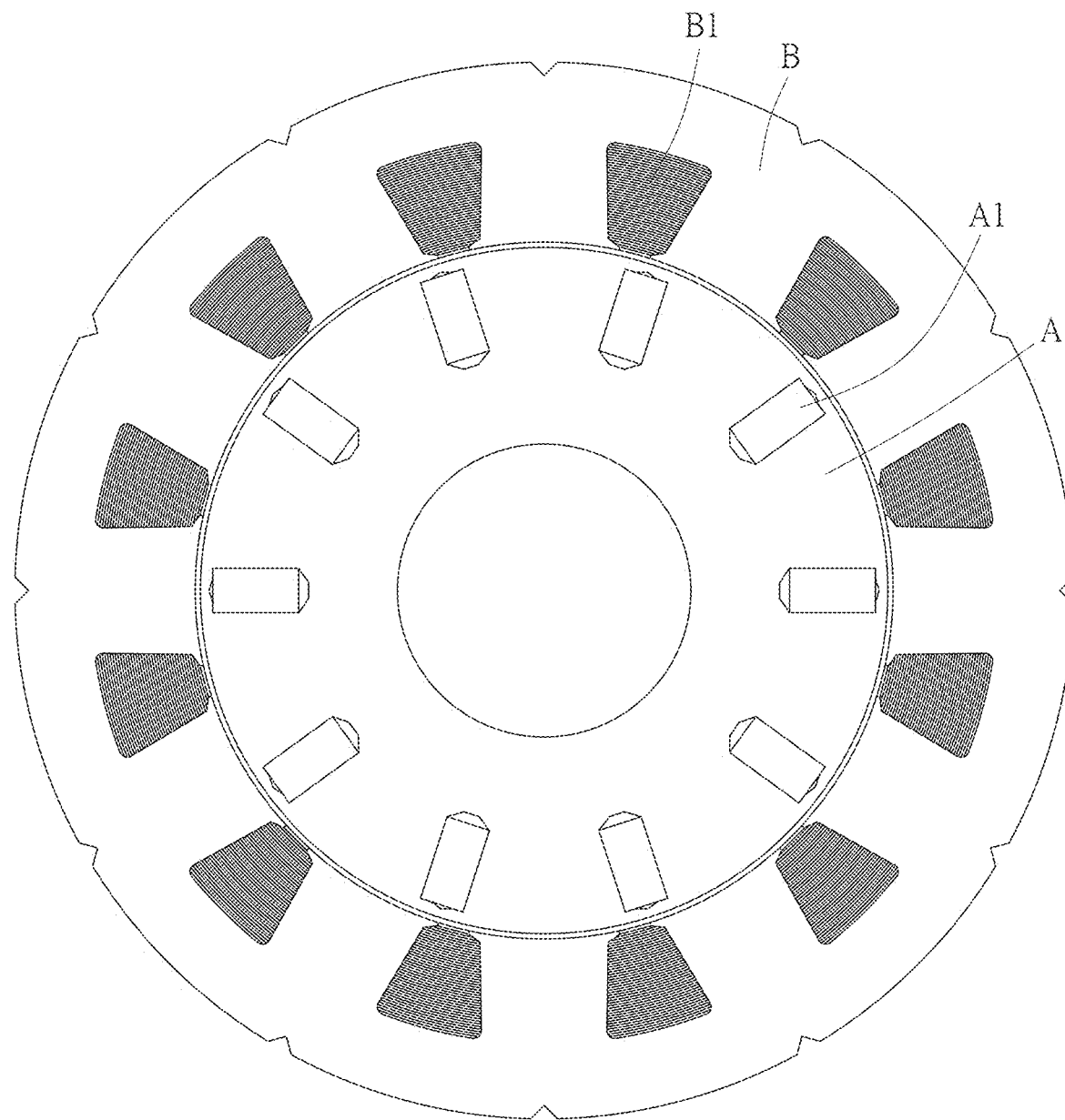
FIG. 6 is a schematic view of a conventional motor structure.

Referring to FIG. 5A and FIG. 5B, compared to the conventional motor (S+Flat) having the second magnetic member (C2) arranged linearly, the structure of the motor (S+V) having the second magnetic members (12) arranged in a V shape of the present invention is stronger, so it can withstand higher stress and rotational speed and have less deformation.

Therefore, regardless of the deformation of the motor (S+V) under the torque, magnetic saturation, stress distribution and high-speed operation, the output result of the motor (S+V) of the present invention is better than that of the motor (S+Flat) having the second magnetic member (C2) arranged linearly, so it has better quality and efficiency.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A spoke-type rotor structure for a motor, comprising:
a rotor core, having a plurality of spoke-type first magnetic members that are arranged radially around a periphery of the rotor core, two oblique second magnetic members being provided between every adjacent two of the first magnetic members, the two second magnetic members being arranged in a V shape relative to a center of the rotor core,
wherein a radius of the rotor core is R, a length of the first magnetic member is ls, a length of the second magnetic member is lv, a length component of the second magnetic member on the radius of the rotor core is x, an included angle between the first magnetic member and the second magnetic member is β, an included angle between every adjacent two of the first magnetic members is α, and the above parameters satisfy:

$$ls+x<R, \text{ wherein } x=lv \cdot \cos(180°-β);$$

and $$90°+α/2<β<180°.$$

2. The spoke-type rotor structure as claimed in claim 1, wherein every adjacent two of the first magnetic members and the two second magnetic members jointly surround an area, the first magnetic members and the second magnetic members face the area with a same magnetic pole.

3. The spoke-type rotor structure as claimed in claim 1, wherein in the rotor core, a distance t1 between the two second magnetic members is between 10% and 40% of a length lv of the second magnetic member.

4. The spoke-type rotor structure as claimed in claim 3, wherein in the rotor core, the distance t1 between the two second magnetic members is between 30% and 50% of a thickness T of the second magnetic member.

5. The spoke-type rotor structure as claimed in claim 1, wherein in the rotor core, a distance t2 between the second magnetic member and the first magnetic member is between 10% and 40% of a length lv of the second magnetic member.

6. The spoke-type rotor structure as claimed in claim 5, wherein in the rotor core, the distance t2 between the second magnetic member and the first magnetic member is between 30% and 50% of a width T of the second magnetic member.

7. A motor structure, comprising
a rotor core, having a plurality of spoke-type first magnetic members that are arranged radially around a periphery of the rotor core, two oblique second magnetic members being provided between every adjacent two of the first magnetic members, the two second magnetic members being arranged in a V shape relative to a center of the rotor core; and
a stator core, covering the rotor core, the stator core having a plurality of stator windings arranged annularly, the stator windings corresponding to the first magnetic members and the second magnetic members,
wherein a radius of the rotor core is R, a length of the first magnetic member is ls, a length of the second magnetic member is lv, a length component of the second magnetic member on the radius of the rotor core is x, an included angle between the first magnetic member and the second magnetic member is $\beta$, an included angle between every adjacent two of the first magnetic members is $\alpha$, and the above parameters satisfy:

$ls+x<R$, wherein $x=lv\cdot\cos(180°-\beta)$;

and $90°+\alpha/2<\beta<180°$.

8. The motor structure as claimed in claim 7, wherein every adjacent two of the first magnetic members and the two second magnetic members jointly surround an area, the first magnetic members and the second magnetic members face the area with a same magnetic pole.

9. The motor structure as claimed in claim 7, wherein in the rotor core, a distance t1 between the two second magnetic members is between 10% and 40% of a length lv of the second magnetic member.

10. The motor structure as claimed in claim 9, wherein in the rotor core, the distance t1 between the two second magnetic members is between 30% and 50% of a thickness T of the second magnetic member.

11. The motor structure as claimed in claim 7, wherein in the rotor core, a distance t2 between the second magnetic member and the first magnetic member is between 10% and 40% of a length lv of the second magnetic member.

12. The motor structure as claimed in claim 11, wherein in the rotor core, the distance t2 between the second magnetic member and the first magnetic member is between 30% and 50% of a width T of the second magnetic member.

* * * * *